(No Model.)

J. R. BARTRUFF.
TWO WHEELED VEHICLE.

No. 388,107. Patented Aug. 21, 1888.

Witnesses:
John E. Parker
William D. Conner.

Inventor:
John R. Bartruff.
By his Attorneys,
Howson and Sons

UNITED STATES PATENT OFFICE.

JOHN R. BARTRUFF, OF BELLEFONTE, PENNSYLVANIA.

TWO-WHEELED VEHICLE.

SPECIFICATION forming part of Letters Patent No. 388,107, dated August 21, 1888.

Application filed July 13, 1887. Serial No. 244,175. (No model.)

*To all whom it may concern:*

Be it known that I, JOHN R. BARTRUFF, a citizen of the United States, and a resident of Bellefonte, Centre county, Pennsylvania, have invented certain Improvements in Two-Wheeled Vehicles, of which the following is a specification.

My invention relates to that class of two-wheeled vehicles known as "road-carts," the object of my invention being to so construct such a vehicle that it will be light, neat, and compact and composed of but few parts, which can be cheaply made and put together. This object I attain in the manner described hereinafter, reference being had to the accompanying drawings, in which—

Figure 1:
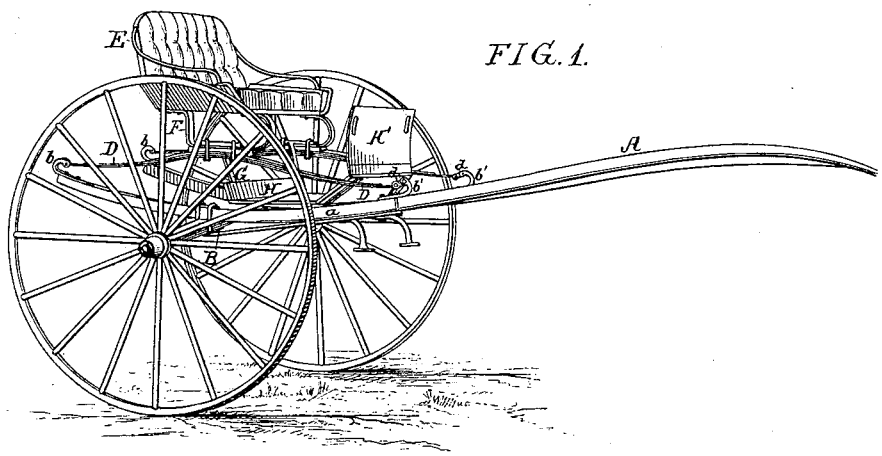
Figure 2:
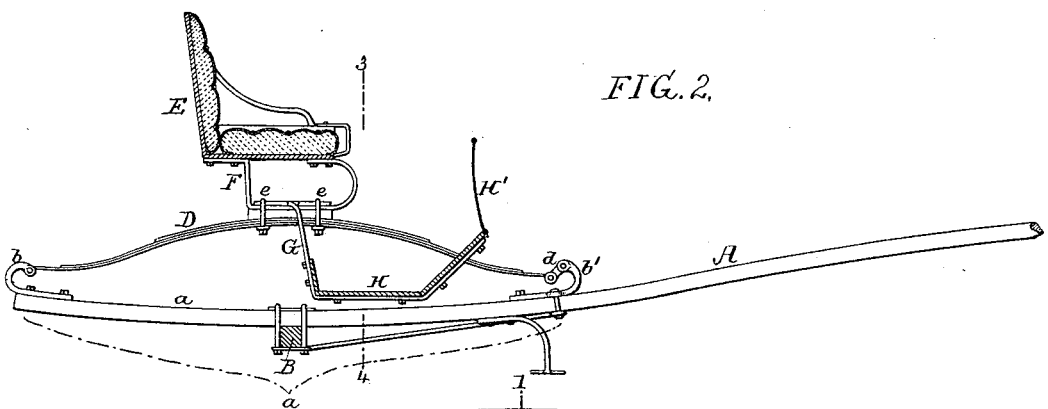
Figure 3:
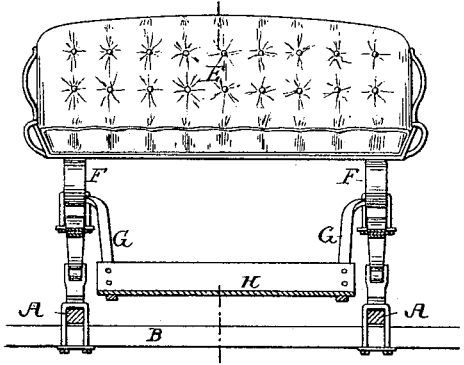
Figure 4:
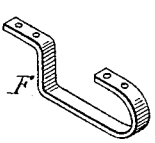

Figure 1 is a perspective view of my improved vehicle. Fig. 2 is a sectional elevation on the line 1 2, Fig. 3. Fig. 3 is a transverse section on the line 3 4, Fig. 2, and Figs. 4 and 5 are detached views of the seat and foot-board irons.

B is the axle, to which are directly secured the shafts A, which are curved, as shown in Fig. 2, and extend to the rear of the axle. To the rear ends of the shafts are attached brackets $b$, and to the latter are hung the rear ends of the springs D, the front ends of the same being hung through the medium of links $d$ to brackets $b'$ on the shafts. The portions $a$ of the shafts between the front and rear brackets, $b\ b'$, are curved, as shown in Fig. 2, which allows more dip of the springs, and at the same time renders the shafts more elastic than they would be if straight. The springs carry both the seat and the foot-board and the seat-irons F, which are made in the peculiar form shown in Fig. 4, being bolted to the seat and attached to the springs by clips $e$, as shown in Fig. 2.

The brackets G, which carry the foot-board H and dasher H', are secured to the springs by the same clips, $e$, which secure the seat-irons, as will be seen in Fig. 2.

Figure 5:
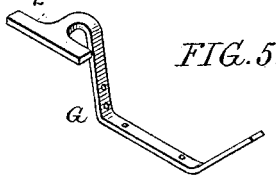

The brackets G are of the peculiar form shown in Figs. 2, 3, and 5, so that when the springs are depressed the foot-board will clear the shafts on each side and the axle at the rear.

It will be seen that the frame composed of the seat E, seat-irons F, brackets G, and foot-board H is perfectly rigid, the seat E and foot-board H tying the parts F and G firmly together, so that a very light and compact framework is insured. A light phaeton-body may, however, be used, if desired, in place of the structure shown, and the springs may in some cases be connected directly to the shafts; or, on the other hand, there may be a link, $d$, at each end of the spring.

I claim as my invention—

1. The combination of the axle, the shafts connected directly thereto, and having portions curved upward in front and rear of the axle, and springs connected to the shafts in front and rear of the axle, and carrying the body of the vehicle, all substantially as specified.

2. The combination, in a two-wheeled vehicle, of the axle, shafts connected directly thereto, springs connected to the shafts, seat-irons, and brackets connected to the springs, a seat secured to said seat-irons, and a foot-board secured to the brackets, all substantially as described.

3. The combination, in a two-wheeled vehicle, of the axle, the shafts connected thereto, the springs connected to the shafts, the seat-irons and seat secured to the springs and located directly above the axle, and a foot-board carried by brackets curved and bent so as to clear the axle and the shafts as the springs yield, all substantially as set forth.

In testimony whereof I have signed my name to this specification in the presence of two subscribing witnesses.

JOHN R. BARTRUFF.

Witnesses:
WILBUR F. REEDER,
W. E. GRAY.